United States Patent [19]

Schmeal et al.

[11] Patent Number: 4,640,853
[45] Date of Patent: Feb. 3, 1987

[54] FIBER WOUND PLASTIC BEVERAGE CAN

[75] Inventors: W. R. Schmeal; S. N. Singhal; K. H. Lo, all of Houston, Tex.

[73] Assignee: Shell Oil Company, Houston, Tex.

[21] Appl. No.: 764,690

[22] Filed: Aug. 12, 1985

[51] Int. Cl.$^4$ .................... B65D 8/08; D02G 3/00
[52] U.S. Cl. .................... 428/35; 428/377; 220/453; 229/4.5
[58] Field of Search .............. 220/453, 468; 229/4.5; 428/35, 293, 297, 377; 426/127

[56] References Cited

U.S. PATENT DOCUMENTS

| | | | |
|---|---|---|---|
| 2,873,226 | 2/1959 | Davies et al. | 154/83 |
| 3,098,582 | 7/1963 | Martin | 220/67 |
| 3,445,049 | 5/1969 | Carpenter, Jr. | 229/4.5 |
| 3,567,536 | 3/1971 | Wickersham, Jr. | 428/35 |
| 4,004,727 | 1/1977 | Rausing et al. | 428/35 |
| 4,181,239 | 1/1980 | Heiremans et al. | 428/35 |
| 4,379,014 | 6/1983 | Rausing et al. | 156/191 |

Primary Examiner—Roland E. Martin
Assistant Examiner—James J. Seidleck
Attorney, Agent, or Firm—Jennifer R. Ross

[57] ABSTRACT

A carbonated beverage can which will withstand pressure from carbonated beverages without bursting or excessive swelling which comprises a can wall made up of a thermoplastic core, fiber-adhesive wound layers contiguous to the thermoplastic core, and a barrier layer contiguous to or within the thermoplastic core or contiguous to or within the fiber-adhesive wound layers.

10 Claims, 5 Drawing Figures

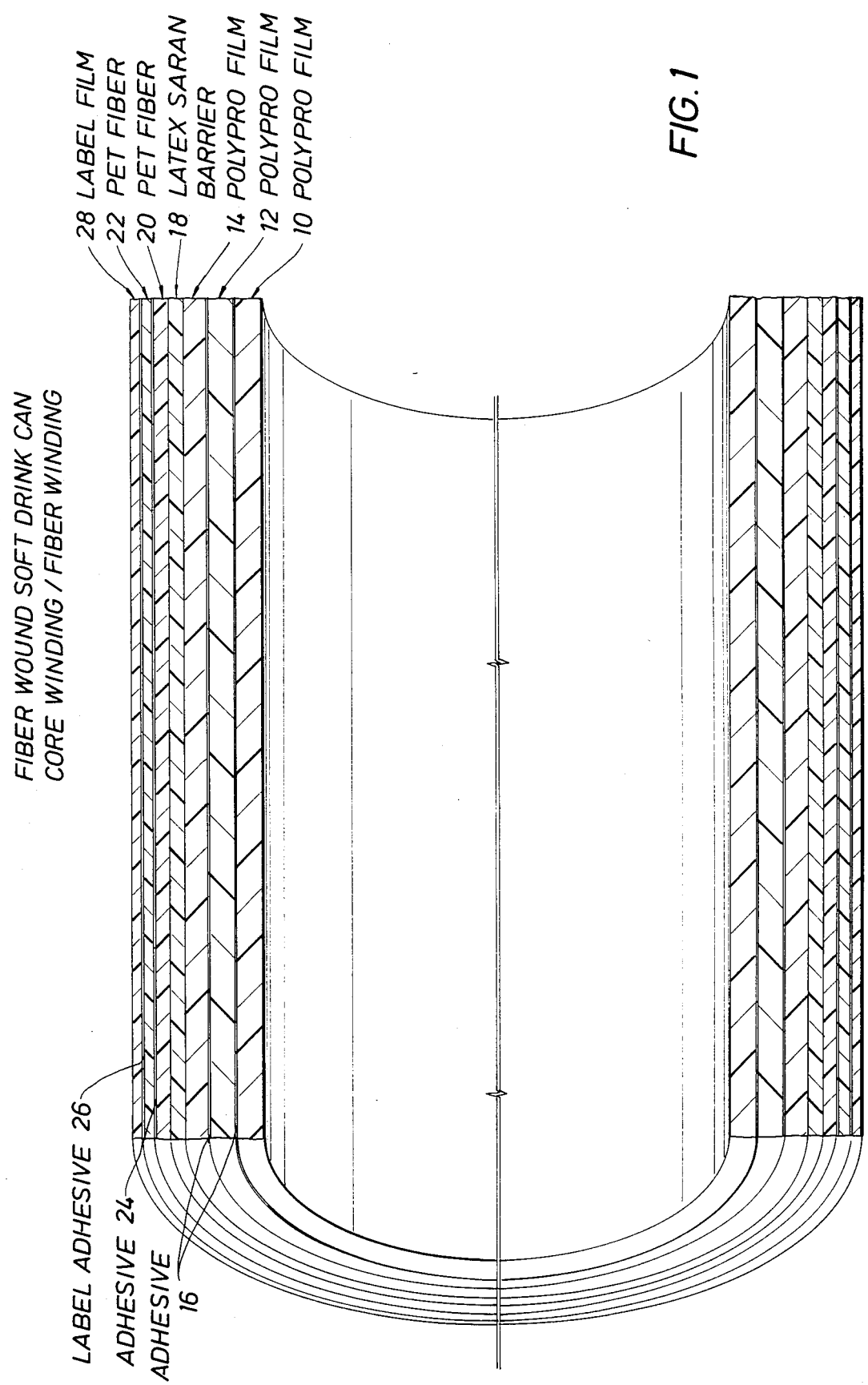

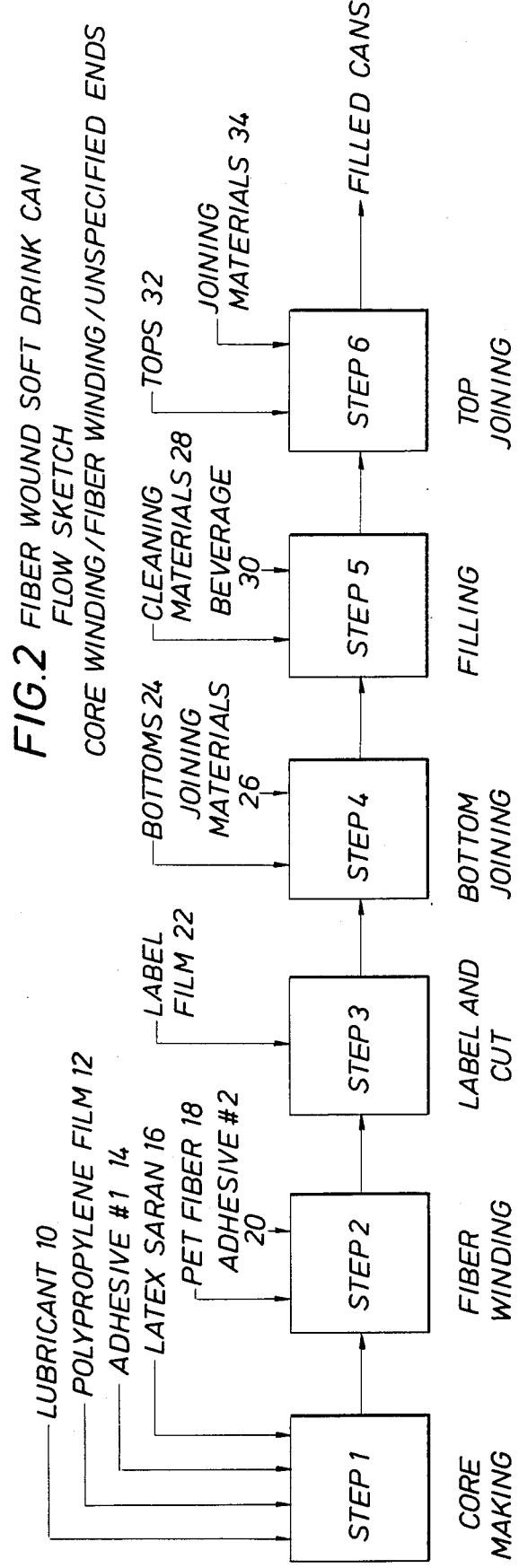
FIG.2 FIBER WOUND SOFT DRINK CAN FLOW SKETCH
CORE WINDING/FIBER WINDING/UNSPECIFIED ENDS
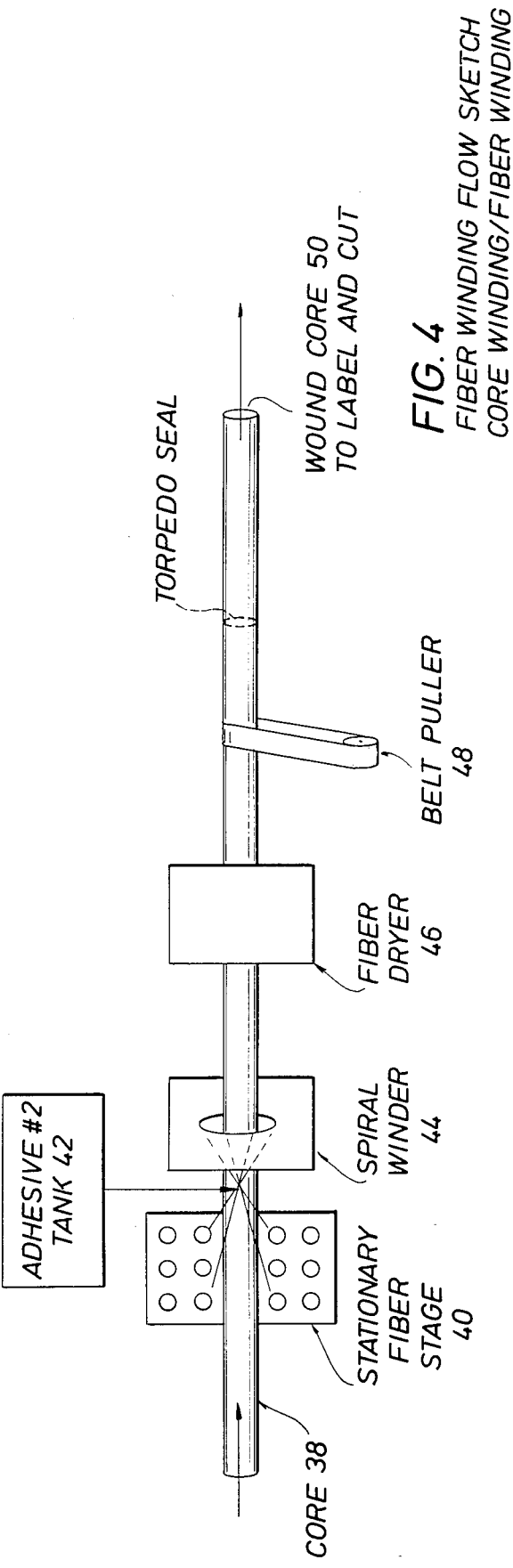
FIG.4 FIBER WINDING FLOW SKETCH
CORE WINDING/FIBER WINDING

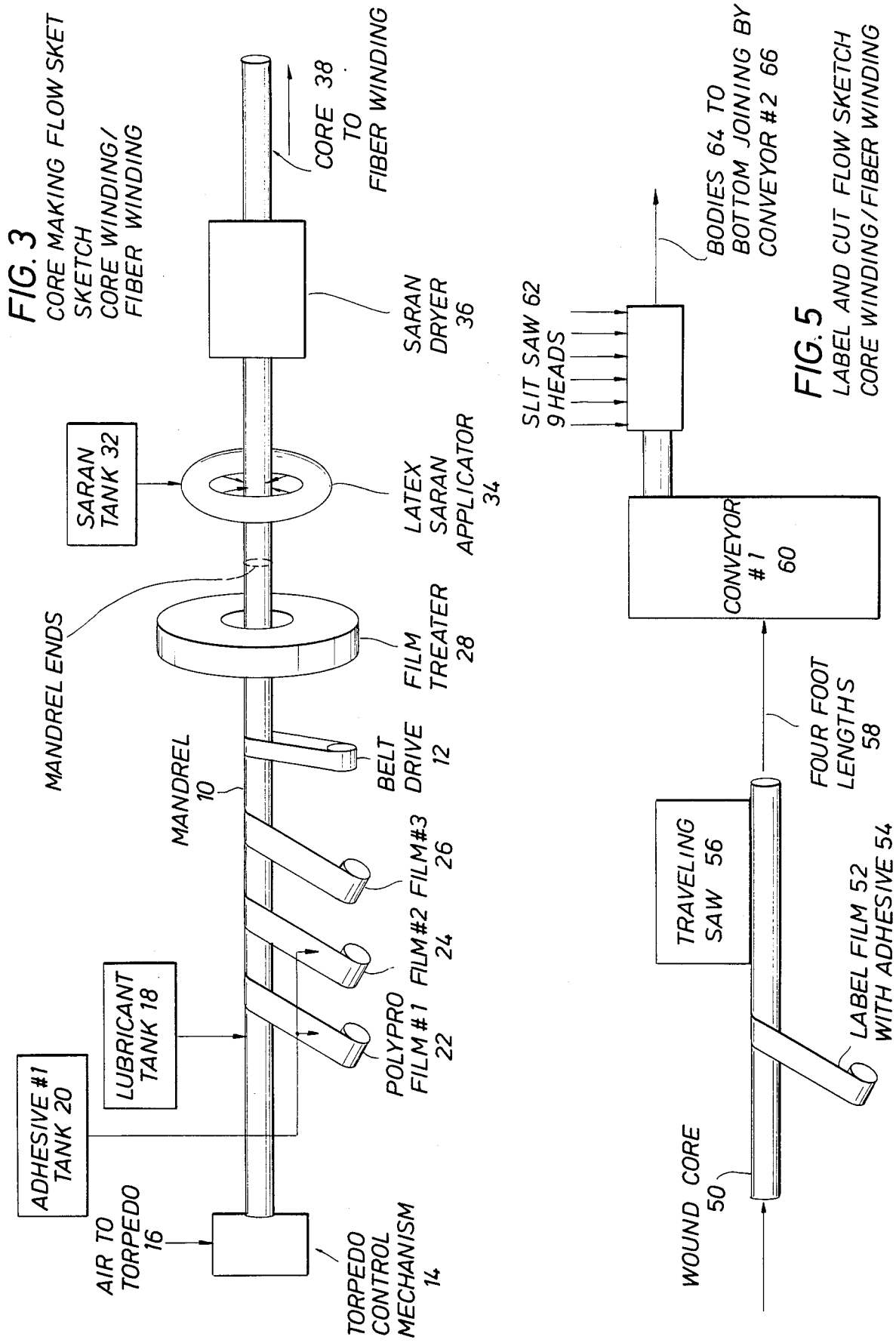

FIBER WOUND PLASTIC BEVERAGE CAN

OBJECT OF THE INVENTION

The object of the present invention is the formation of a fiber wound container plastic beverage can which will withstand pressure from carbonated beverages under conditions of temperature that would be required of a carbonated beverage container, including having low swelling (or stretching) properties. A further purpose of this invention is to fabricate a beverage can which has fabrication cost less than those of the typically used aluminum can to allow its commercial acceptance.

Numerous sizes, shapes and forms of beverage cans are available to the consumer. Many of them are made of aluminum, in particular those which must withstand high pressure conditions of carbonated beverages such as soft drinks, and thus rely on the strength of the aluminum as a can wall material. Various shapes, forms and sizes of beverage *bottles* are available, however, this application is not addressed to bottles, but rather, to *cans*.

The performance criteria for carbonated beverage cans are:

(1) The can must have a sufficiently low permeability so as to be able to assure contents' shelf life in storage, at supermarkets, and at home for up to 4 months. This means a maximum loss of 16% $CO_2$ for the typical carbonated beverage can.

(*2) The strength of the carbonated beverage can must be sufficient to withstand 87 psig at a 95° F. liquid temperature. This is so that cans stored in hot warehouses or trunks of automobiles for extended periods of time will not burst, split, crack or otherwise fail at a pressure below the buckling stability limit of the can lid. This pressure is about 87 psig for a conventional 209 pull tab aluminum lid.

(3) The carbonated beverage can should be able to withstand axial loads which occur when cans are stacked in warehouses and during end seaming of tops and bottoms.

(*4) The volume stability of the carbonated beverage can is very important. The can must retain cosmetic and structural integrity, to allow performance in the vending distribution channel. Thus, the can should have nonexistent or low creep tendency at 95° F. liquid temperature and 87 psig.

The two performance criteria with asterisks (*) above are the most important and the most difficult criteria to meet in fabricating a carbonated beverage can.

Heretofore, the fabrication of plastic cans has been difficult, keeping in mind the harsh performance criteria of carbonated beverage cans. U.S. Pat. No. 4,379,014 discloses a plastic beverage can which is fabricated by winding thermoplastic tape around a mandrel and then reinforcing the tape. U.S. Pat. No. 4,379,014 teaches the use of a single, homogeneous polyester sheet material to construct a container, presumably for vessels capable of withstanding internal pressure, for example those containing carbonated beverages. As taught, the homogeneous oriented sheet is wrapped monodirectionally, and continuously onto a mandrel to form a cylinder. As taught in U.S. Pat. No. 4,379,014, there is no possibility to separate two important functions of the container wall: (1) to provide a i continuous vessel wall to prevent leakage; (2) to provide the necessary *strength* when pressurized. Because the sheet material functions as *both* the strength material and the homogeneous and continuous finished container wall, the sheet material *must* be *continuous* to prevent leakage.

Further, U.S. Pat. No. 4,379,014 does not teach the use of barrier layers to prevent carbonation loss in beverage containers. It is well known in the art of beverage containers formed of polyester material that carbonation loss is a significant performance factor, especially in smaller sized containers (16 ounces or less) where the volume of the carbonated contents is in a high ratio with respect to the surface area of the container. In homogeneous, thin wall polyester vessels as taught in U.S. Pat. No. 4,379,014, such a barrier layer would be required for carbonated beverage containers in order to meet shelf life requirements in smaller sized containers.

U.S. Pat. No. 3,662,944 discloses a batch process for making containers one at a time, rather than a continuous process. This patent also does not teach the fiber wrap angles which must be employed in making a fiber wound plastic beverage can. Also required in U.S. Pat. No. 3,662,944 is a plastic layer, with or without an aluminum foil "label" layer, which is necessary to support the wound fibers to impart the rigidity necessary of such a container.

U.S. Pat. No. 2,873,226 teaches another batch process wherein a polystyrene inner form and a thermoset resin system is used as an adhesive.

U.S. Pat. No. 3,735,895 teaches a non-pressurized vessel with glass fibers bound by epoxy resin.

U.S. Pat No. 3,098,582 teaches a batch process where a curing resin system is used as an adhesive.

SUMMARY OF THE INVENTION

Applicants have discovered a new way of continuously fabricating a carbonated beverage can which has a barrier layer to give good shelf life, low permeability, sufficient strength to withstand the pressures of a carbonated beverage at the temperatures to which it might be subjected, sufficient axial load bearing stiffness and strength so that the top closure may be joined and the cans may be stacked in warehouses, good volume stability, i.e. no excessive swelling and the can retains cosmetic and structural integrity, and which feels like a can and will gain consumer acceptance. Applicants have successfully fabricated a beverage can which meets all of the above criteria and which is made of themoplastic materials and which includes ends made of either thermoplastic or metalic materials. Essentially, the can comprises a can wall made of a thermoplastic core, fiber wound layers contiguous to the thermoplastic core, and barrier layer contiguous to or within the thermoplastic core. The can is capable of withstanding pressure by (1) the use of a continuously fabricated homogeneous container body/wall (function to prevent leakage) upon which: (2) fiber strands (strength function) are wound/applied, said fibers not necessarily homogeneous in their coverage of the separate body/wall, and said vessel capable of withstanding pressure and resisting volume swelling.

BRIEF DESCRIPTION OF THE DRAWINGS

FIG. 1 shows a fiber wound can according to the invention.

FIG. 2 is an overview of the process of the invention.

FIG. 3 shows a process for making the core of the can of the present invention.

FIG. 4 is a fiber winding flow sketch.

FIG. 5 shows the labeling and application of adhesive onto the wound core.

DETAILED DESCRIPTION OF THE INVENTION

FIG. 1 shows a fiber wound soft drink can which, beginning at the innermost layer, is fabricated of a polypropylene film 10, a polypropylene film 12, and a polypropylene film 14, which are contiguous to one another and which contain adhesive 16 between the layers of films 10 and 12 and films 12 and 14. An extruded core may be used instead of a film wound core, however, FIG. 1 is illustrative of the film wound core. Adjacent to film 14 is a latex Saran ® (copolymer of polyvinylidene chloride) barrier 18. Adjacent barrier 18 is a layer of PET fiber 20. Adjacent to fiber 20 is a second adhesive 24. PET fiber 22 is contiguous to adhesive 24 and label adhesive 26 is applied to PET fiber 22. Lastly, label film 28 is applied to adhesive 26.

A basic process of this invention may be seen in an overview in FIG. 2, which is a flow sketch of one method of fabrication of the fiber wound beverage can. In Step 1, (core making), lubricant 10, polypropylene film 12, adhesive 14, and latex Saran 16 are combined to make the core. In Step 2 (fiber winding), a PET fiber 18 and adhesive 20 are combined. In Step 3 (labeling and cutting) a label film 22 is applied and the can is cut. In Step 4 (bottom joining), can bottoms 24 and joining materials 26 are used to attach the bottoms 24 to the can. In Step 5 (filling), cleaning materials 28 and beverage 30 are used to clean the can and fill it with the desired beverage. In Step 6 (top joining), tops 32 and joining materials 34 are used to join the tops 32 to the can.

FIG. 3 refers to Step 1—core making. A mandrel 10 is affixed with a belt drive 12 to rotate the mandrel 10. A torpedo control mechanism 14 is attached to the end of mandrel 10 and a source of air 16 is provided to torpedo control mechanism 14. The mandrel 10 is lubricated from lubricant tank 20 and adhesive from adhesive tank 20 is applied to polypropylene film 22, 24 and 26. Films 22, 24 and 26 are sequentially wrapped at an appropriate angle around mandrel 10. Films 22, 24 and 26 are then treated by film treater 28. At some point after treatment of films 22, 24 and 26, mandrel 10 ends. Saran from tank 32 is then applied to the moving films by an applicator 34. The films progresses through dryer 36 and emerges as core 38. Core 38 passes through a stationary fiber stage 40, adhesive is applied from adhesive tank 42 to core 38 and a spiral winder 44 winds the fibers from stationary fiber stage 40 onto core 38. Core 38 is passed through fiber dryer 46 and belt puller 48 and emerges as wound core 50. A torpedo seal resides inside the core and is attached to the torpedo control mechanism 14 by a stationary torpedo control wire which passes through a hole in the center of the mandrel 10 and also through the center of the moving core 38. The purpose of the seal is to retain pressure to prevent failure of the core 38 due to torques applied by the stationary fiber stage 40 and the spiral winder 44.

In FIG. 5 the wound core 50 is passed through label film 52 and adhesive 54 for application of the label film. Traveling saw 56 cuts wound core 50 into four foot lengths 58 and transfers lengths 58 onto a conveyor 60 and then through a slit saw 62 to cut the wound core 50 into appropriate lengths for the cans. The bodies of the can 64 are then sent by conveyor 66 to have bottoms joined, to be filled, and to have tops joined.

Core 38 may be made of polypropylene, polyethylene, polyketone, polyethyleneterephthalate (PET), paper or some other suitable material or combination of materials. Core 38 may be constructed by extrusion, or core winding of films onto a lubricated fixed mandrel. The core may be of any thickness but 0.010–0.030 inches is preferred. The core should be homogeneous enough to prevent leakage and also rigid enough to allow the application of the fibers 40 and 44.

EXAMPLE 1—Core Making

A 13 mil extruded polypropylene core of about 2.60" outside diameter was pressurized with air and torque was applied to simulate winding torques. The torque to failure is noted below in Table 1 as a function of the applied internal air pressure. Bursting occurred at 40 psi.

TABLE 1

| Applied Pressure, psi | Torque at Failure, inch-lb |
|---|---|
| 0 | 15 |
| 8 | 170 |
| 15 | 225 |
| 18 | 250 |
| 40 | burst |

The thermoplastic core may be filled with inert material or recycled plastic for the purpose of allowing faster extrusion and lowering cost. Examples of filling materials are $CaCO_3$, mica, and talc. A barrier to reduce the rate of diffusion of water and gases such as $CO_2$ and $O_2$ may be added to the core by coextrusion, or by application contiguous to or within the fiber-adhesive layer. Adhesives may be applied to either side of the barrier. The purpose of the barriers is to enhance the utility of the container. Examples of such materials are Saran ® (copolymer of polyvinylidene chloride) and EVOH (hydrolyzed copolymers of vinyl acetate and ethylene). These may be applied by spraying such material in a latex form onto the exterior of the core or extruding the barrier within the base core material, or as an integral or laminated film in the film wound core construction. The coextrusion may include additional layers of adhesives on either or both sides of the barrier. An example might be ABA, ABC or ACBCA, where A is the base core material, B is a barrier and C is an adhesive. The first letter designates the internal layer and the last letter the external layer.

Various fibers may be used in this invention. Such fibers are glass, polyethylene terephthalate (PET), nylon, rayon, or cotton. These fibers are characterized as having very high elastic modulus, excellent creep properties, very high breaking strength, high initial yield strength and low cost. Such fiber properties are crucial to the design of an economical/high performance beverage container to replace metal cans.

Fiber strand dimensions are characterized by their weight per unit length (or its reciprocal) in terms of yield, in units of yards per pound or in terms of denier. Denier is a measure of strand diameter for a given fiber type.

Each fiber strand is made up of many small filaments held together with sizing material. For example, Celanese Type X785 PET fiber has a strand diameter calculated to be 14.5 mils when in a cylindrical state and it is made up of 74 filaments of 1.4 mil diameter each. When this fiber is wound under tension, it flattens out on the mandrel to a width of about 30.5 mils and a height of about 3 mils. This flattening is very beneficial from a performance/cost perspective since it allows the core to be covered by thin, economic layers of PET fibers. These fibers inhibit creep of the underyling thermoplastic core.

It is quite noteworthy that it is not necessary to completely cover the thermoplastic core with fibers to gain the benefit of their superior mechanical properties.

Fibers wound about a 2.6 inch diameter core at 60° for example make a complete revolution in 4.72 inches of cylinder length. This is the band width.

Two layers of fibers are used, each with a winding angle with respect to the axis of the cylinder which is the negative of the other, viz, ±60°. This creates a balance of forces which prevents twisting of the cylinder when under pressure.

In each layer, 136 fibers of a width of 30.5 mils would be required for a complete coverage of the core, calculated by dividing the band width by the fiber width and multiplying by the sine of the winding angle.

EXAMPLE 2—Fiber Winding

Fibers were wound on a 13 mil polypropylene extruded tube using a McClean Anderson Model 1, filament winder at Westhollow Research Center. Test set A was carried out with glass and PET fiber available from previous filament winding and pultrusion work. Test sets B and C were carried out with Celanese Type 785 PET seatbelt cord of 840 denier. Dimensions of this fiber and other typical candidate fibers which were on hand, PPG, ECG 75 glass, and Allied 1W69 500 denier PET are given in Table 2.

Static burst tests were carried out in the existing pipe testing apparatus according to a modification of the ASTM test standards Test No. D 1599. Test cylinders were cut to lengths of at least ten inches from the wound specimens. Special end plugs were designed after trials of numerous designs. The specimens were immersed in the water bath, filled with water, and pressurized with nitrogen rapidly until they burst.

Long term creep tests were carried out by pressuring specimens to 55 psig at room temperature is an ambient air environment. The conditions after a few seconds represent the initial conditions after can filling and it is the swelling which occurs after this period which is relevant to creep performance.

Short term high temperature creep tests were also carried out. Specimens were immersed in the hot water bath at 110° F., filled with water, and pressurized to 100 psig with nitrogen. This condition was more severe than required for a carbonated beverage container to emphasize problem areas which require further study, thus there was *no* adherence to the ASTM test specification of holding the specimen for thirty (30) minutes before beginning measurements. The change in volume with time was recorded by photography. The first volume swell picture was taken at the time that the pressure gauge on the waterbath holding tank indicated "100 psig". The radius of the specimen at various axial positions and the height were recorded, and the volume calculated. Base conditions were chosen after temperature and pressure were established (arbitrarily five minutes into the test) for evaluation of long term creep and volume swell. Volume changes after this time represent the effects of creep under the constant, very severe conditions of 100 psig and 110° F.

RESULTS

Test Set A

The first set, Set A, was carried out to screen effects of fiber thickness, balanced versus unbalanced fiber layers and the role of adhesive for glass and PET fibers. All wound specimens passed the quick burst test by exceeding 100 psig pressure at 110° F. and none exhibited observable volume expansion, as seen in Table 3.

Presence or absence of adhesive, presence or absence of balanced layers of fibers, and fiber thickness were varied. Unbalanced specimens exhibited some twisting. The fiber winding angle was 89°.

A two mil outer surface of Hercules T-503 oriented polypropylene film was used for handling purposes.

RESULTS

Test Sets B and C

Test Set B was designed to provide performance data on PET fiber wound layers on the polypropylene tube combined in accordance with the expected stress and strain response of the composite container. Test Set B was undertaken to test the use of 840 denier PET fiber. This fiber was selected because it was relatively fine in diameter (Tire cord is typically 1,000 denier) and has an enhanced tendency to flatten. Flattening occurs because it is composed of individual filaments which are fewer in number, but thicker than those used in tire cord. The filament diameter was 1.4 mils. Fiber surface coverage was varied and a winding angle of ±60 degrees was used although various different winding angles may be calculated and used other than 60°. The calculated stresses in a pressurized cylinder are such that those in the hoop direction are twice those in the axial direction. The optimum angle of orientation of the fibers to avoid bursting can be determined based upon the stiffness and strength properties of both the polypropylene tube and the PET fibers so as to provide the required strength ratio in the hoop and in the axial directions. The analysis shows such an angle to be about ±60 degrees from the axis of the cylindrical container.

Test Set C was developed to improve the fiber winding techniques and provide a better set of specimens for long term creep test, end seaming tests and adhesion tests.

Specimens of surface coverage of PET fibers of 0–71% layer were tested in Set B described in Table 4, while specimens of 37–100% coverage per layer were tested in Set C, described in Table 5. All test specimens in both sets B and C were constructed by winding two layers of fiber about the core in a balanced fashion, with winding angles of +60° and −60° with respect to the axis.

It was observed that 136 strands of fiber covered 100% of the core. Surface coverage per layer was measured by counting the number of strands on a specimen and dividing by 136. Fiber layer thicknesses were measured by caliphers and found to be 6 to 7 mils for two layers for the high coverage cases. (See Tables 4 and 5). Fiber raw materials costs were estimated by weighing the amount of fiber on a specimen. A PET fiber price of $1.40/per lb. was used.

Specimens in Test B were subject to static burst after completing a 4-hour creep test at 110° F. Burst pressure equaled or exceeded 100 psig for all specimens tested of surface coverage of 25% per layer or greater. (See Table 4). Burst pressure for the 71% coverage per layer specimens exceeded 300 psig.

One sample of 53% fiber coverage per layer from test set B and three samples of 54.5%, 72% and 100% fiber coverage per layer were subjected to long term creep tests for 18 weeks at room temperature and 55 psig internal nitrogen pressure. Samples exhibited between 0–4% volume swell after an equilibration period of several minutes. Growth was in the radial rather than the axial direction. Swelling in the equilibration period was 1–2%. This swelling may occur during filling of containers and should be taken into account in can design.

It is important that excellent resistance to swelling is exhibited by samples of lower fiber coverage as well as higher fiber coverage. This illustrates the surprising capability of the fibers to inhibit creep of the thermoplastic core even when not in direct contact at every location on the surface.

Specimens from sets B and C were subject to short term creep tests at 110° F. and 100 psig. Volumetric swelling was noted over three time periods, zero to 5 seconds, 5 seconds to 5 minutes, and 5 minutes to 4 hours. The "Pressurization" time period represents pressurization to 100 psig, a second "Early Period" to establish temperature equilibrium, and finally a "Terminal Period" of long duration.

A summary of test results show the following ranges of swelling:

| Time Period | Volumetric Swell | | |
| --- | --- | --- | --- |
| | 0–12% Coverage Per Layer | 36–53% Coverage Per Layer | 70–90% Coverage Per Layer |
| Pressurization (0–5 sec) | Burst | 4–5% | 4–5% |
| Early Period (5 sec–5 min) | — | 7–14% | 3–5% |
| Terminal Period (5 min–4 hr) | — | 2–11% | 0–3% |

Rejection of one specific data point in the Early Period for the 36% per layer coverage specimen would reduce the volumetric swell reported herein for the Terminal Period. Results for each specimen are for the Terminal Period and are presented in Tables 4 and 5.

Initial volume swell is a function of fiber coverage, and can be controlled through it, but surprisingly, long duration volume swell is low even for a structure with as little as 53% fiber coverage per layer. The volume swell at 35% fiber coverage may be reduced further by either (1) wrapping some of the fibers in an axial direction, (2) providing a protective layer, such as an adhesive, over or under the fibers, (3) use of an outer wrap impermeable to water, or (4) use of a fiber grade with improved mechanical properties. FIG. 6 is a graph of burst pressure versus PET fiber coverage and supports a claim of 20% coverage as a lower limit of acceptability. A burst pressure requirement is established for the tested specimens of 87 psig at 95° F. equivalent to aluminum lid design requirements. Interpolation of test data suggests a fiber coverage of about 20% per layer is needed to achieve this pressure requirement. Note that test conditions are severe, 110° F. compared to the required 95° F.

Note that the specifications for a commercial generic PET bottle require adequate performance at only 95° F. rather than 110° F., although the time period is longer. It has been found in practice that the liquid temperature in a container seldom exceeds 95° F. because of the long time required for warming even when exposed to very high ambient temperatures. Specimens with fiber coverage of 70–90% exhibited volumetric swell no greater than 6% after pressurization to 100 psig at 110° F., the very severe conditions of testing.

Photomicrographs of 64× magnification were made of the surface of the polypropylene core after the short term creep tests were completed for specimens of 37% and 90% coverage per layer. Only in the specimen of lower coverage could the indentations created by previous contact with PET fibers be observed.

The lack of indentations of fibers into the polypropylene core for the higher surface coverage case suggests that creep of polypropylene relative to the PET fibers did not occur.

In conclusion, test specimens in which PET fiber coverage per layer was as low as 35% exhibited burst pressures over 175 psig after immersion in water at 110° F. for four hours. This is well in excess of the vapor pressure of 87 psig of carbonated beverages at 95° F. and in excess of the burst pressure of 40 psig of specimens uncovered by PET fiber. Long term creep tests run for 18 weeks at room temperature and 55 psig pressure with specimens of 53–100% fiber coverage showed that volume swell of 1–4% occurred after a brief equilibration period, with no apparent correlation with fiber coverage. Short term creep tests run for four hours at severe conditions of 110° F. and 100 psig showed volume swell of 0–3% for specimens of 70–90% coverage per layer and 2–11% for specimens of 35–53% coverage per layer after a five minute equilibration period.

TABLE 2

DESCRIPTION OF FIBERS AVAILABLE FOR TESTING

| Material Thickness | Fiber Type | Standard Size | | Filament Diameter | Strand Dimensions | | Layer (when wound) |
| --- | --- | --- | --- | --- | --- | --- | --- |
| | | | | | Cylindrical Diameter | | |
| | | yd/lb | denier | mils | Calculated mils | Measured mils | mils |
| Glass | OCF type 30 P346BX675 | 675 | 6622 | 0.525 | 29.5 | | 9 |
| | PPG ECG75 | 7,500 | 576 | 0.375 | 9 | 10.1 | |
| PET | Allied 1W74 | 4,470 | 1000 | 1 | 15.9 | | |
| | Allied 21 strand material[a] | 212 | 21,000 | 1 | 73 | | 10 |
| | Allied 5 strand material[a] | 850 | 5,000 | 1 | 36 | | |
| | Celanese 785 Seat Belt Fiber | 5,320 | 840 | 1.4 | 14.5 | | 2½–4 |
| | Allied 1W69-LO-500 | 894 | 500 | 1 | 11.2 | | |

[a]These materials were created by Allied from the 1W74 base material.

TABLE 3

FIRST SCREEN FIBER TEST RESULTS (SET A)

| FIBER | WRAPS | BALANCED LAYERS[a] | FIBER BAND THICKNESS mils | ADHESIVE[b] | QUICK BURST Pass? | PSIG |
|---|---|---|---|---|---|---|
| Glass | 1 | no | 6 | yes | yes | 162 |
| | 1 | no | 6 | no | yes | 152 |
| | 2 | yes | 12 | no | yes | 172 |
| | 2 | yes | 12 | yes | yes | 147 |
| | 2 | no | 12 | yes | yes | 167 |
| | 2 | no | 12 | no | yes | 200 |
| PET | 1 | no | | no | yes | 162 |
| | 1 | no | | yes | yes | 117 |

[a]Balanced means each wrap at ± angle. An 89° angle was used in tests.
[b]Adhesive was Shell Kraton 1107 pressure sensitive.
[c]There is a 2 mil outer surface of Hercules T-503 OPP film on all specimens for handling purposes.

TABLE 4

FIBER TEST PROGRAM (SET B)
(All specimens consist of balanced layers of 840 denier PET fiber wound at ±60°)

| SURFACE COVERAGE PER LAYER % | STRANDS PER PASS PER LAYER | WINDING PASSES PER LAYER | FIBER THICKNESS (TWO LAYERS) MILS | STATIC BURST PSIG | SHORT TERM SWELL AT 110° F.[b] | FIBER RAW MATERIAL COST ¢/CAN[d] | LONG TERM SWELL AT ROOM TEMPERATURE[c] |
|---|---|---|---|---|---|---|---|
| 71 | 24 | 4 | 6–7 | >300 | 0–3% | 1.50 | — |
| 53 | 24 | 3 | 6 | >200 | 2–5% | 1.12 | 3–4% |
| 35 | 24 | 2 | 3–4 | — | — | 0.75 | — |
| 35 | 12 | 4 | 4 | 175 | — | 0.75 | — |
| 35 | 8 | 6 | 4–5 | — | — | 0.75 | — |
| 25 | 8 | 4 | 4–5 | 100 | HIGH | 0.54 | — |
| 12 | 4 | 4 | 4–5 | <40 | HIGH (burst) | 0.22 | — |
| 0 | 0 | 0 | 0 | <40 | | | — |

[a]After creep test at 110° F.
[b]Change in volume between 5 minutes and 4 hours
[c]Change in volume between 5 minutes and 18 weeks
[d]Basic $1.40/lb price for PET fiber

TABLE 5

FIBER TEST PROGRAM (SET C)
(All specimens consist of balanced layers of 840 denier PET fiber wound at ±60°)

| SURFACE COVERAGE PER LAYER % | STRANDS PER PASS PER LAYER | WINDING PASSES PER LAYER | FIBER THICKNESS (TWO LAYERS) MILS | STATIC BURST PSIG | SHORT TERM SWELL AT 110° F.[a] | LONG TERM SWELL AT ROOM TEMPERATURE[b] | FIBER RAW MATERIAL COST ¢/CAN[c] |
|---|---|---|---|---|---|---|---|
| 100 | 68 | 2 | — | — | — | 2–3% | 2.00 |
| 90 | 61 | 2 | 7.5 | — | 0–1% | — | 1.88 |
| 72 | 49 | 2 | 6.5 | — | 0–1% | 0–3% | 1.43 |
| 54.5 | 37 | 2 | 6.0 | — | — | 1–3% | 1.00 |
| 37 | 25 | 2 | 3.5 | — | 4–11% | — | 0.7 |

[a]Change in volume between 5 minutes and 4 hours
[b]Change in volume between 5 minutes and 18 weeks
[c]Basic PET fibers at 1.40/lb.

What is claimed in the invention is:

1. A beverage can which will withstand pressure from carbonated beverages and which has acceptable swelling resistance, which comprises:
   a thermoplastic core;
   at least two fiber layers wound on said thermoplastic core;
   adhesive layer between said fiber layers and said core and between said fiber layers themselves where said fiber layers are made of multiple fibers in an ordered relation; and
   a barrier layer contiguous to either said thermoplastic core or said fiber layers or within said thermoplastic core or said fiber layers.

2. The beverage can of claim 1, wherein said can comprises:
   a thermoplastic core selected from the group of polypropylene, PET, paper, polyethylene and polyketone wherein said core is either spirally wound or extruded and wherein said fiber layer is selected from the group of glass, PET, nylon, rayon and cotton wherein said barrier layer is either a copolymer of polyvinylidine chloride or hydrolyzed copolymers of vinyl acetate and ethylene.

3. The beverage can of claim 1, wherein said thermoplastic core is polypropylene, wherein said fiber layer is PET and wherein said barrier layer contains hydrolyzed copolymers of vinyl acetate and ethylene.

4. The beverage can of claim 1, wherein said core is extruded.

5. A beverage can which will withstand pressure from carbonated beverages and which has acceptable swelling resistance, which comprises:
   a polypropylene core;
   at least two PET fiber layers wound on said polypropylene core;

adhesive layers between said fiber layer and said core and between said fiber layers themselves where said fiber layers are made of multiple fibers in an ordered relation; and a barrier layer contiguous to either said polypropylene core or said fiber layers or within said polypropylene core or said fiber layers.

6. The beverage can of claim 5, wherein said polypropylene core is spirally wound or extruded.

7. A beverage can which will withstand pressure from carbonated beverages and which has acceptable swelling resistance, which comprises:

a thermoplastic core;

at least two fiber layers wound on said thermoplastic core;

adhesive layers between said fiber layer and said core and between said fiber layer and said core and between said fiber layers themselves; where said fiber layers are made of multiple fibers in an ordered relation; and a barrier layer contiguous to either said thermoplastic core or said fiber layers.

8. The beverage can of claim 7, wherein said can comprises a thermoplastic core selected from the group of polypropylene, PET, paper, polyethylene and polyketone, wherein said core is either spirally wound or extruded and wherein said fiber layer is selected from the group of glass, PET, nylon, rayon and cotton, wherein said fiber adhesive wound layer contains at least 20% fiber coverage, and wherein said barrier layer is either a copolymer of polyvinylidene chloride or hydrolyzed copolymers of vinyl acetate and ethylene.

9. The beverage can of claim 7, wherein said thermoplastic core is polypropylene, wherein said fiber layer is PET, and wherein said barrier layer contains hydrolyzed copolymers of vinyl acetate and ethylene.

10. The beverage can of claim 7, wherein said core is extruded.

* * * * *